US012306956B2

(12) United States Patent
Katsuki et al.

(10) Patent No.: US 12,306,956 B2
(45) Date of Patent: May 20, 2025

(54) TRANSFER ANOMALY DETECTION USING ONLINE DEEP SETS

(71) Applicant: International Business Machines Corporation, Armonk, NY (US)

(72) Inventors: Takayuki Katsuki, Tokyo (JP); Haoxiang Qiu, Tokyo (JP); Tadanobu Inoue, Yokohama (JP); Ryuki Tachibana, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 17/903,461

(22) Filed: Sep. 6, 2022

(65) Prior Publication Data

US 2024/0078318 A1 Mar. 7, 2024

(51) Int. Cl.
*G06F 21/57* (2013.01)
*G06F 21/55* (2013.01)
*G06N 20/00* (2019.01)

(52) U.S. Cl.
CPC .......... *G06F 21/577* (2013.01); *G06F 21/552* (2013.01); *G06N 20/00* (2019.01)

(58) Field of Classification Search
CPC ......... G06F 21/577; G06N 20/00; G06N 3/09
USPC ........................................................ 726/25
See application file for complete search history.

(56) References Cited

U.S. PATENT DOCUMENTS

| 9,038,172 | B2 | 5/2015 | Miller | |
|---|---|---|---|---|
| 2021/0312674 | A1 | 10/2021 | Abrol | |
| 2022/0138504 | A1* | 5/2022 | Fathi Moghadam | .. G06N 20/20 |
| | | | | 706/12 |

FOREIGN PATENT DOCUMENTS

| CN | 110224987 B | 9/2021 |
|---|---|---|
| WO | 2022037191 A1 | 2/2022 |

OTHER PUBLICATIONS

Ide, T., Phan, D. T., & Kalagnanam, J. (2017). Multi-task multi-modal models for collective anomaly detection. 2017 IEEE International Conference on Data Mining (ICDM). https://doi.org/10.1109/icdm.2017.27 (10 pages).
Atsutoshi Kumagai NTT Software Innovation Center, Kumagai, A., Center, N. T. T. S. I., Tomoharu Iwata NTT Communication Science Laboratories, Iwata, T., Laboratories, N. T. T. C. S., Profile, N. T. T. C. S. L. V., Yasuhiro Fujiwara NTT Communication Science Laboratories, Fujiwara, Y., & Metrics, O. M. V. A. (Dec. 1, 2019) Supplemental Material: Transfer anomaly detection by Inferring Latent Domain Representations (pp. 1-5).

(Continued)

*Primary Examiner* — Lan Dai T Truong
(74) *Attorney, Agent, or Firm* — Caleb Wilkes; Otterstedt & Kammer PLLC

(57) ABSTRACT

A computerized machine learning anomaly detection model trained on a plurality of samples of one or more source domains (optionally, one or more source domains and the target domain) is accessed. Using online deep sets, one or more domain vectors are computed for each target domain sample at an observation point, each target domain sample corresponding to a given target domain, where the one or more domain vectors represent a similarity and difference among the source and target domains. The target domain sample is processed using the anomaly detection model trained on the plurality of samples of the source to generate an anomaly score, the processing being based on the computed one or more domain vectors.

20 Claims, 5 Drawing Sheets

(56) References Cited

OTHER PUBLICATIONS

Atsutoshi Kumagai et al., Transfer anomaly detection by Inferring Latent Domain Representations: Proceedings of the 33rd International Conference on Neural Information Processing Systems. Guide Proceedings. (pp. 1-11.) Retrieved Feb. 14, 2023, from https://dl.acm.org/doi/10.5555/3454287.3454509.

Peter Mell and Timothy Grance, The NIST Definition of Cloud Computing, NIST Special Publication 800-145, Sep. 2011, cover, pp. i-iii and 1-3.

What is online machine learning?—definition from Techopedia. Techopedia.com. (n.d.). Retrieved Jul. 19, 2022, from https://www.techopedia.com/definition/32818/online-machine-learning (9 pages).

\* cited by examiner

FIG. 6

$$\mathcal{L} \equiv \frac{1}{D} \sum_d L^{\{d\}}, \text{ where}$$

$$L^{\{d\}} \equiv \frac{1}{N_t^{\{d\}}} \sum_{x \in X^{\{d\}}} s_\theta(x) - \frac{\lambda}{N_t^{+\{d\}} N_t^{-\{d\}}} \sum_{x+ \in X^{+\{d\}}, x- \in X^{-\{d\}}} f(s_\theta(x^+) - s_\theta(x^-))$$

TRANSFER ANOMALY DETECTION USING ONLINE DEEP SETS

BACKGROUND

The present invention relates to the electrical, electronic and computer arts, and more specifically, to artificial intelligence systems.

Anomaly detection is an important capability of artificial intelligence and other developing applications. Anomaly detection detects anomalous samples, i.e., samples which do not exhibit the pattern(s) of normal samples. Many conventional anomaly detection methods are based on unsupervised or semi-supervised learning, including autoencoder-based methods, density-based methods, and the like. Supervised anomaly detection uses anomaly labels, often where all training samples correspond to one domain. Often, these techniques require a large number of observations on the target domain before inference can be carried out, and have no capability of online learning.

As used herein, "online" machine learning is a type of machine learning (ML) that continuously improves performance by processing new input in real or near-real time. In contrast, "batch" learning algorithms are static, using large data sets to train and validate outcomes before the model moves to production. Online learning algorithms are trained incrementally as new data becomes available.

Conventional anomaly detection techniques often use normal samples or anomalous and normal samples from source domains, and normal samples or anomalous and normal samples from a target domain to perform training (usually, there are no anomalous samples from a target domain, primarily due to a general lack of anomaly labels for the target domain). Thus, training usually needs to be performed for each domain. Later conventional methods inferred anomaly detectors for target domains by utilizing latent domain vectors (latent representations of the domains), which alleviates the need for retraining on the target domain. These later conventional methods inferred the target domain's latent domain vector from a set of normal samples or anomalous and normal samples in the target domain.

One conventional anomaly detection technique models an anomaly score function for each domain utilizing autoencoders, where the properties of the domain are provided by the latent domain vector. The training of the anomaly score function elevates the scores of anomaly samples and reduces the scores of normal samples. Such training may be performed with or without labels. While labels for a target domain may be difficult to obtain, labels for source domains may be more readily available. Thus, some techniques train utilizing normal samples of the source and target domains, and anomaly samples of only the source domains. Other conventional methods train utilizing normal samples of source and target domains, and anomaly samples of only the target domain. For example, one conventional method defines the anomaly score function using an autoencoder. In addition, target domains typically exhibit a specific property or properties which are reflected in the anomaly score function by a corresponding latent domain vector.

SUMMARY

Principles of the invention provide techniques for transfer anomaly detection using online deep sets. In one aspect, an exemplary method includes the operations of accessing a computerized machine learning anomaly detection model trained on a plurality of samples of one or more source domains (optionally, one or more source domains and the target domain); computing, using online deep sets, one or more domain vectors for each target domain sample at an observation point, each target domain sample corresponding to a given target domain, where the one or more domain vectors represent a similarity and difference among the source and target domains; and processing the target domain sample using the anomaly detection model trained on the plurality of samples of the source domains to generate an anomaly score, the processing being based on the computed one or more domain vectors.

In one aspect, an apparatus comprises a memory and at least one processor, coupled to the memory, and operative to perform operations comprising accessing a computerized machine learning anomaly detection model trained on a plurality of samples of one or more source domains (optionally, one or more source domains and the target domain); computing, using online deep sets, one or more domain vectors for each target domain sample at an observation point, each target domain sample corresponding to a given target domain, where the one or more domain vectors represent a similarity and difference among the source and target domains; and processing the target domain sample using the anomaly detection model trained on the plurality of samples of the source domains and trained on at most ten samples of the given target domain to generate an anomaly score, the processing being based on the computed one or more domain vectors.

In one aspect, a non-transitory computer readable medium comprises computer executable instructions which when executed by a computer cause the computer to perform the method of accessing a computerized machine learning anomaly detection model trained on a plurality of samples of one or more source domains (optionally, one or more source domains and the target domain); computing, using online deep sets, one or more domain vectors for each target domain sample at an observation point, each target domain sample corresponding to a given target domain, where the one or more domain vectors represent a similarity and difference among the source and target domains; and processing the target domain sample using the anomaly detection model trained on the plurality of samples of the source domains and trained on at most ten samples of the given target domain to generate an anomaly score, the processing being based on the computed one or more domain vectors.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in hardware such as digital circuitry. Some aspects (e.g., an anomaly detection model) can be implemented in the form of a computer program product including a computer readable storage medium with computer usable program code for performing the method steps indicated/describing circuit(s) as disclosed. The software can then be executed on a system (or apparatus) including a memory, and at least one processor that is coupled to the memory.

Techniques of the present invention can provide substantial beneficial technical effects. For example, one or more embodiments provide one or more of:

- improves the technological process of anomaly detection in artificial intelligence/computerized machine learning by providing techniques to construct an anomaly detection model for a target domain without gathering target data or retraining on the target domain;
- training only required on source domains;
- supports all types of training samples, including samples with or without anomaly labels and with or without domain labels; and
- wide applicability: techniques applicable to many problems in addition to anomaly detection, such as image classification and instance segmentation.

These and other features and advantages of the present invention will become apparent from the following detailed description of illustrative embodiments thereof, which is to be read in connection with the accompanying drawings.

BRIEF DESCRIPTION OF THE DRAWINGS

FIG. 6 shows aspects of training an anomaly detection model and online deep sets by minimizing anomaly detection loss, in accordance with aspects of the invention.

DETAILED DESCRIPTION

Figure 1:
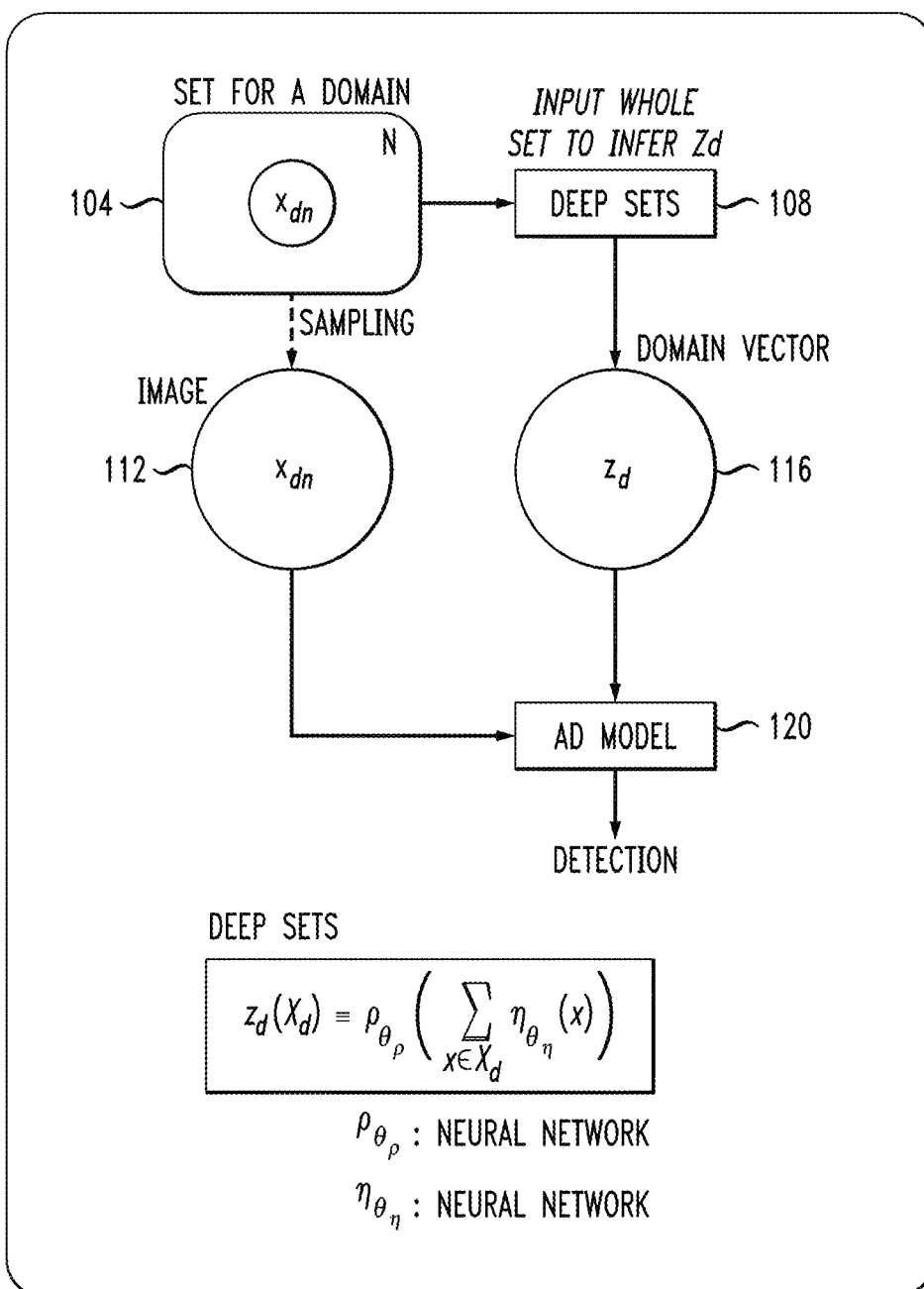
FIG. 1 is a high-level block diagram of a conventional anomaly detector.

The ability to immediately perform the task of anomaly detection on a new target domain is quite useful for many industries, but such tasks usually require time for the training of an anomaly detection model on the target domain and/or some amount of data regarding the target domain (which can substantially delay the start of anomaly detection). Transfer learning may be adapted to provide for anomaly detection without training on the target domain. In one example embodiment, zero-shot transfer learning with online deep sets is disclosed and provides for anomaly detection without training on a target domain.

Online deep sets are based on online learning, a type of machine learning where data is accessed in a sequential order and a predictive model is sequentially updated as the data is accessed. Online learning allows, for example, for the dynamic adaptation to new patterns, such as the new patterns of new target domains. In one example embodiment, a zero-shot transfer anomaly detection method is disclosed where only a single observation or, at most, a mini-batch of samples (one to ten samples) are used for anomaly detection; no training on the target domain is required.

Initially, online deep sets are derived and original loss and regularization terms are designed, by using the online deep sets, to make the zero-shot transfer possible. In one example embodiment, an anomaly detection model for a target domain is constructed without gathering target data or retraining on the target domain. The training input is training data, with or without anomaly labels, from source domains (supervised learning may be used if labels are available). The output is an anomaly detection model for any target domain, generated without requiring additional training or target data.

In general, transfer learning is used to generate a solution for a target domain by using data from one or more source domains. Conventional approaches often use unsupervised learning based on labeled data from the source domain and unlabeled data from the target domain. Other conventional approaches use semi-supervised learning based on labeled data for both the source and target domains.

Transfer learning approaches are designed to operate without anomalous target samples. One such technique uses a two-step approach: discriminative features are mined from source domain data (for example, with the use of a neural network) and a semi-supervised algorithm is applied to normal target samples.

In one conventional transfer learning technique (also known as domain adaptation), a latent domain vector is estimated for each target domain based on a set of normal samples from the target domain. (The estimation may be performed using a neural network.) The approach infers an anomaly detector for the target domain without retraining on the target domain or the need to provide anomaly samples from the target domain. The latent domain vectors for target domains are derived using, for example, neural networks and deep sets based on different sizes of normal instances.

An anomaly score function scores normal samples of the target domain at a low value (a result of minimizing the reconstruction error of the normal samples), while anomaly labels are used to generate higher values for anomalous samples (a result of using a differentiable area under the curve (AUC) loss as the regularizer (this can be effective even with a small number of anomalies)).

The above method supports constructing an anomaly detection model for the target domain without retraining on the target domain. However, before starting anomaly detection, a substantial number of observations on the target domain are required as a batch for domain transfer. Other limitations include no support for incremental update of the anomaly detection model and a requirement that the source domain label must be attached for training data.

In the cited conventional method, given a set of samples $X := \{x_1, \ldots, x_N\}$, an autoencoder is trained by minimizing a loss function:

$$L(\theta_F, \theta_G) := \frac{1}{N} \sum_{n=1}^{N} \left\| x_n - G_{\theta_G}(F_{\theta_F}(x_n)) \right\|^2,$$

where N is a count of samples; $F_{\theta_F}$ is a neural network with the parameter $\theta_F$ (the encoder); $G_{\theta_G}$ is a neural network with the parameter $\theta_G$ (the decoder); $\|\cdot\|$ is a Euclidean norm; and $\|x - G_{\theta_G}(F_{\theta_F}(x))\|^2$ is a reconstruction error of x. Reconstruction errors of normal instances become low when the autoencoder is trained with normal instances; the reconstruction anomaly samples will be high since they are not the subject of training. The reconstruction error can thus be used as the anomaly score.

The skilled artisan will be familiar with prior art work related to transfer anomaly detection by inferring latent domain representations, and will appreciate that similar nomenclature has been adapted herein, as appropriate. For example, the skilled artisan will be familiar with prior techniques used to obtain an appropriate domain-specific anomaly score function, which outputs its anomaly score given an instance, for each target domain, including defining the anomaly score function conditioned on the latent domain vector $z_d$, as well as prior-art estimation of latent domain vectors (which are unobserved) from data using neural network modeling. The skilled artisan will also be familiar with objective functions employed in the prior art and the inference of a domain-specific anomaly score function.

FIG. 1 is a high-level block diagram of a conventional anomaly detector 100. The deep sets neural network 108 is trained on a set of source domain training images 104 using either supervised or unsupervised learning. During anomaly detection, a single image is submitted to anomaly detection model 120 and a detection result (such as an anomaly score) is generated.

In one example embodiment, a domain vector 116, as described above, is generated by the deep sets neural network 108 and submitted with the single image 112 to the anomaly detection model 120. The generated result is thus influenced by the domain vector difference indicated by the domain vector 116.

Figure 2:
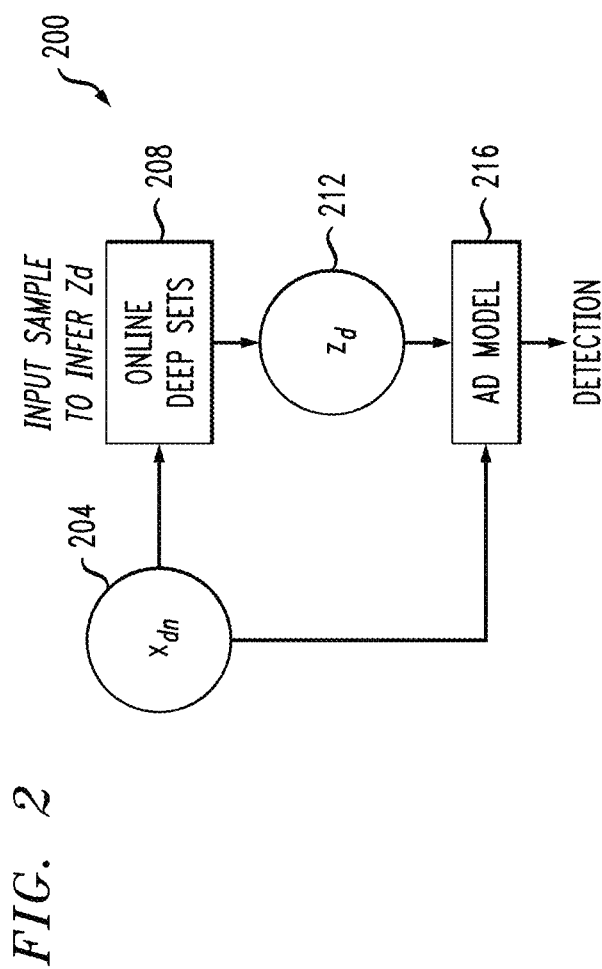
FIG. 2 is a high-level block diagram of an example anomaly detector, in accordance with an example embodiment.

FIG. 2 is a high-level block diagram of an example anomaly detector 200, in accordance with an example embodiment. The embodiment of FIG. 2 defines the loss function and regularization term for a group of samples vs. a whole dataset for conventional methods. An online deep sets neural network 208 is trained on a set of source domain training images 204 using either supervised or unsupervised learning. During anomaly detection, a single image is submitted to anomaly detection model 216 and a detection result is generated.

A domain vector 212 is generated by the online deep set neural network 208 and submitted with an image 204 to the anomaly detection model 216. The generated result is thus influenced by the domain vector difference indicated by the domain vector 212. In effect, the domain vector 212 represents the similarity and difference among domains (that is, an indication of similarity by the domain vector 212 also infers an indication of dissimilarity) and is used as an input of the anomaly detection model 216 to enable domain adaptation based on the disclosed zero-shot transfer technique (no training on a large amount of data of the target domain is required). Online learning is utilized to estimate the domain vector 212 and the anomaly detection model 216 is incrementally updated for each observation (each processed sample) or every fixed-interval(s) or every interval(s) defined with the function of the observation point. Once again, the online deep sets neural network 208 is trained on a set of source domain training images 204 (using either supervised or unsupervised learning). The training on the source domain(s) creates a generalized anomaly detection model 216 that is suitable for performing anomaly detection in any target domain. (It is noted that in one or more embodiments, target domain input data, as described below, is only utilized during a testing phase of the anomaly detection model 216.)

In the example embodiment of FIG. 2, the online deep sets 208 are derived and used to design the original loss function and regularization term(s). A loss is defined for each observation point to update the model and provide improved performance even when only a small number of target samples are available at that point in time. A regularization term is defined to impose the domain vectors:

$$\|z_t - \rho_{\theta_\rho}(\eta_{\theta_\eta}(x_t))\|^2$$

Advantageously, the above regularization term enables the use of a smaller target sample size, such as one to ten samples, that is close to that of the largest sample size at the point, as described above.

In one example embodiment, the online deep sets are defined as:

$$z_t(x_t, d_t) \equiv \rho_{\theta_\rho}(\eta_{\theta_\eta}(x_t) + \xi_{\{t-1, d_t\}}),$$

In the above, $\xi_{\{t-1, d_t\}} \equiv \Sigma_{x_t \in X_{\{t,d\}}} \eta_{\theta_\eta}(x_t)$, $x_t$ is the current observation, t is the timestamp for the current observation, $\rho_{\theta_\rho}$ is a first neural network, $\eta_{\theta_\eta}$ is a second neural network, $d_t$ is domain identifier at t, and z can be defined for each sample, while it is impossible for original deep sets.

In general, the domain vector 212 is computed for each sample at observation point t, where the domain vector 212 represents the similarity and difference among domains and is an input of the anomaly detection model 216 to enable domain adaptation. For example, an anomaly detection model, s(x), based on an autoencoder and reconstruction error is used, where the domain vector 212 is input to an encoder in the autoencoder as:

$$s_\theta(x_t) \equiv \|x_t - G_{\theta_G}(F_{\theta_F}(x_t, z_t))\|^2$$

where $G_{\theta_G}$ is the encoder (a neural network), $F_{\theta_F}$ is the decoder (a neural network), and $\theta^*$ is a parameter for the anomaly detection model 216.

Domain Vector Computation

In one example embodiment, the domain vector 212 is computed with online deep sets, which make it possible to efficiently define a domain vector 212 for each sample. "Deep sets" is a function of the sum of another function's inputted observations, which converts the different number of observations into a vector having the same number of dimensions or a fixed-sized vector. "Online deep sets" expands its summation to a recurrence formula as defined by the following equation for computing the domain vector:

$$z_t(x_t, d_t) \equiv \rho_{\theta_\rho}(\eta_{\theta_\eta}(x_t) + \xi_{\{t-1, d_t\}}),$$

where $\xi_{\{t,d\}} \equiv \Sigma_{x_t \in X_{\{t,d\}}} \eta_{\theta_\eta}(x_t)$ It is noted that z can be defined for each sample, while it is impossible for the original deep sets:

$$z_d(X_d) \equiv \rho_{\theta_\rho}\left(\sum_{x \in X_d} \eta_{\theta_\eta}(x)\right)$$

where $\rho_{\theta_\rho}$ is a neural network, $\eta_{\theta_\eta}$ is a neural network, and d is a domain identifier.

The computational cost is 1/T compared to using original deep sets and only twice compared to the computation of a single domain vector from the full dataset. This also enables the anomaly detection model 216 to be updated incrementally (in an online manner).

Training

In one example embodiment, the anomaly detection model 216 and online deep sets 208 are trained by minimizing an anomaly detection loss (at least containing an unsupervised term and a supervised term) for each observation point to ensure that the anomaly detection model 216 has good performance even when only a small number of target samples are available at that point (upper portion reproduced in FIG. 6 in enlarged form):

$$\mathcal{L} \equiv \frac{1}{D} \sum_d L^{(d)}, \text{ where}$$

-continued $$L^{(d)} \equiv \frac{1}{N_t^{(d)}} \sum_{x \in X^{(d)}} s_\theta(x) - \frac{\lambda}{N_t^{+(d)} N_t^{-(d)}} \sum_{x^+ \in X^{+(d)}, x^- \in X^{-(d)}} f(s_\theta(x^+) -$$

$$s_\theta(x^-)) + \lambda \sum_t \left\| z_t - \rho_{\theta_\rho}(\eta_{\theta_\eta}(x_t)) \right\|^2$$

Regularization Term #1

In one example embodiment, a regularization term is added to impose the domain vectors 212, such as:

$$\left\| z_t - \rho_{\theta_\rho}(\eta_{\theta_\eta}(x_t)) \right\|^2$$

Advantageously, as noted above, the above regularization term enables the use of a smaller target sample size, such as one to ten samples, that is close to that of the largest sample size at the point, as described above.

Regularization Term #2

In one example embodiment, a regularization term is added to impose the intermediate representation in online deep sets contrastive between different source domains. In one example embodiment, the regularization term is given by:

$$-\Sigma_{d' \neq d_t} \| z_t(d_t) - z(d') \|^2$$

Variants of Online Deepsets

In one example embodiment, an average technique is used instead of the summation presented above, as defined below:

$$z'_t(x_t, d_t) \equiv \rho_{\theta_\rho} \frac{1}{t} \left( \eta_{\theta_\eta}(x_t) + (t-1) \xi_{t-1, d_t} \right),$$

In one example embodiment, an exponential average technique is used instead of the summation presented above, as defined below:

$$\tilde{z}_t(x_t, d_t) \equiv \rho_{\theta_\rho} \beta(\eta_{\theta_\eta}(x_t) + (1-\beta) \xi_{t-1, d_t}),$$

where $0 < \beta < 1$.

Testing

During testing, an anomaly score was computed by using the anomaly detection model with the optimized parameters:

$$s_\theta(x_t) \equiv \| x_t - G_{\theta_G}(F_{\theta_F}(x_t, z_t)) \|^2$$

Experiments

Testing was performed using a large dataset of handwritten digits which includes handwritten samples of digits, including 60,000 training samples and 10,000 test samples. The test input was a single or mini-batch of test data from a target domain and the output was an anomaly detection result (anomaly score).

Figure 3:
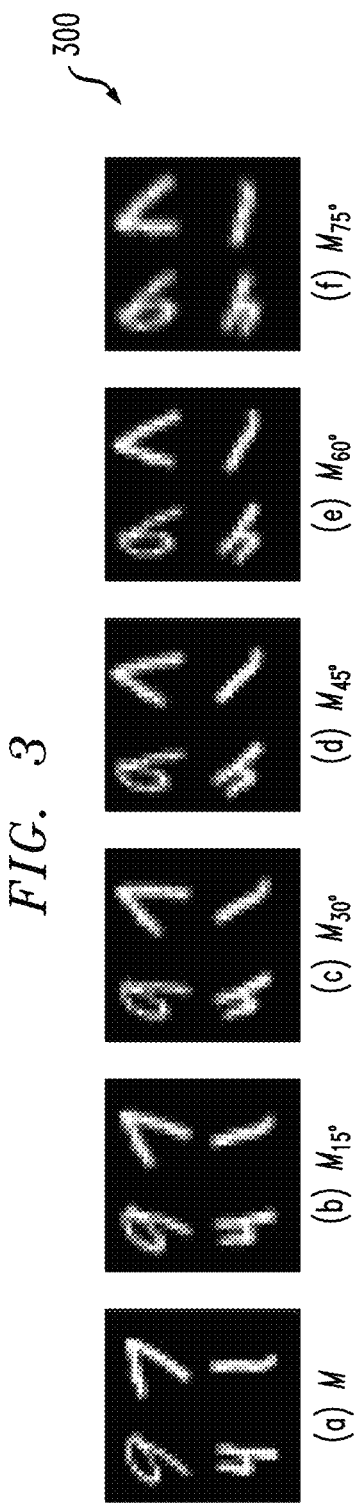
FIG. 3 illustrates anomalous samples from each of six target domains, in accordance with an example embodiment.

FIG. 3 illustrates anomalous samples 300 from each of six target domains, in accordance with an example embodiment. Each domain a-f represents a specific degree of roll rotation and has 1,000 images, which are represented by 256-dimensional vectors, of 10 classes (digits). Each image has one handwritten digit; anomalous images have four digits. Training was performed using all domains a through f.

Figure 4:
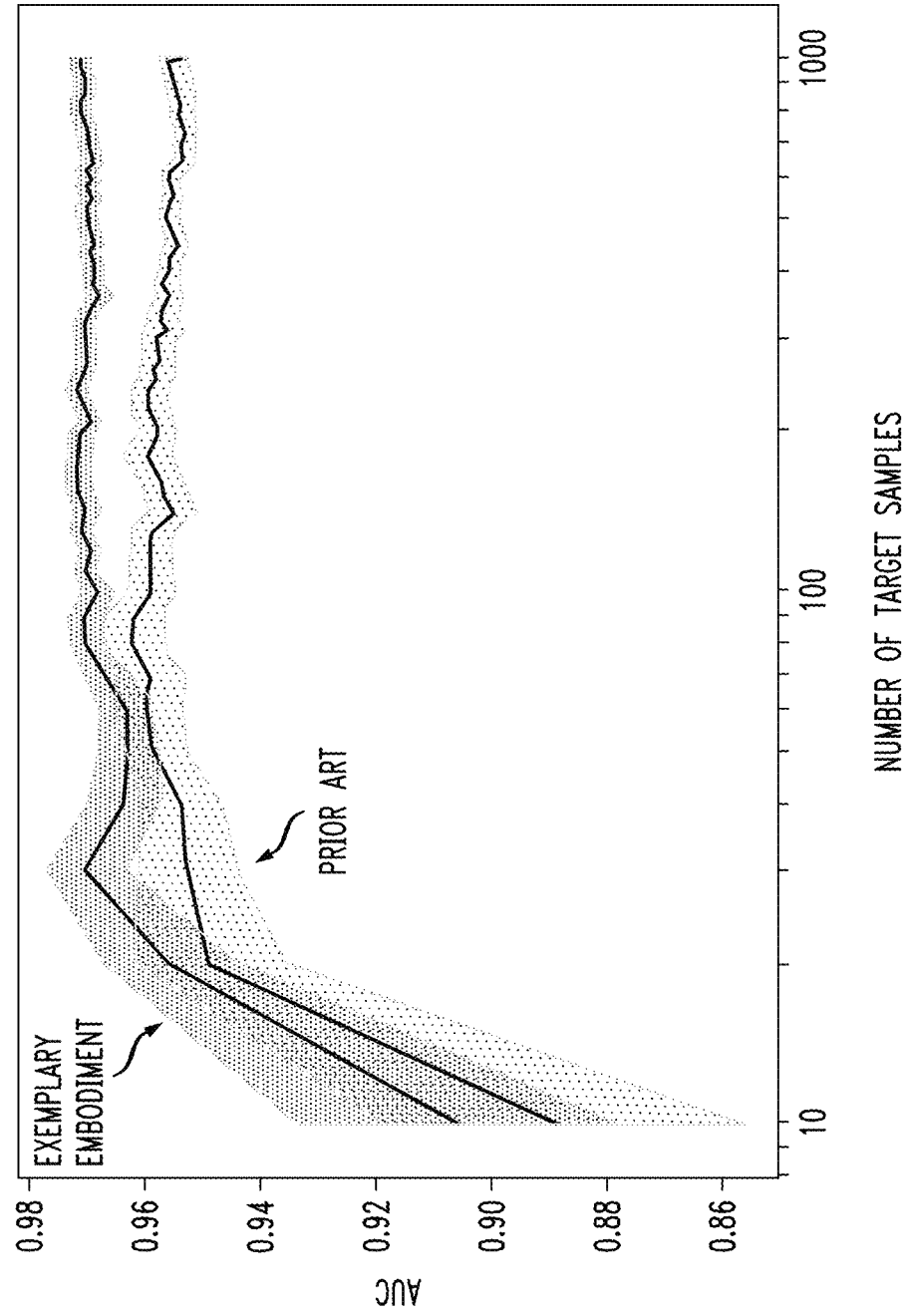
FIG. 4 illustrates the performance of the anomaly detector of FIG. 2 on a large dataset of handwritten digits with respect to a number of target samples, in accordance with an example embodiment.

FIG. 4 illustrates the performance of the anomaly detector of FIG. 2 on a large dataset of handwritten digits with respect to a number of target samples, in accordance with an example embodiment. As illustrated in FIG. 4, the disclosed approach shows higher AUC than a first conventional method at the disclosed number of target samples. As shown in the graph, the performance difference is large with a smaller sample size of the target domain. A better result than that of the cited conventional technique was obtained at each sample size, even when all of the samples were used. As illustrated in FIG. 4, the AUC was 0.97 (upper line) for an exemplary embodiment, as compared to an AUC of 0.96 (lower line) for a conventional system (the shaded/hatched areas represent the confidence intervals (standard error)).

Given the discussion thus far, it will be appreciated that, in general terms, an exemplary method, according to an aspect of the invention, includes the operations of accessing a computerized machine learning anomaly detection model 216 trained on a plurality of samples of one or more source domains (optionally, one or more source domains and the target domain); computing, using online deep sets, a domain vector (optionally throughout, one or more such vectors) for each target domain sample 204 at an observation point, each target domain sample 204 corresponding to a given target domain, where the domain vector 212 represents a similarity and difference among the source and target domains; and processing the target domain sample 204 using the anomaly detection model 216 trained on the plurality of samples of the source domain to generate an anomaly score, the processing being based on the computed domain vector 212.

In one example embodiment, the target domain sample is classified based on the anomaly score. Generally, classification can be carried out using aspects of the invention for many practical applications, such as image recognition/classification, intrusion detection, medical care, and industrial asset monitoring. Inferencing with a deployed model could be used for practical applications such as activating security systems, maintaining, repairing or replacing industrial equipment, and the like.

In one example embodiment, the online deep sets 208 are defined by expanding a summation of Deep sets to a recurrence formula as defined by:

$$z_t(x_t, d_t) \equiv \rho_{\theta_\rho}(\eta_{\theta_\eta}(x_t) + \xi_{t-1, d_t}),$$

where t is a timestamp for the current observation $\xi_{\{t,d\}} \equiv \Sigma_{x_i \in X_{\{t,d\}}} \eta_{\theta_\eta}(x_i)$, where $\rho_{\theta_\rho}$ is a first neural network, $\eta_{\theta_\eta}$ is a second neural network, $x_t$ is a current observation at the observation point t, and $d_t$ is a domain identifier at the observation point t.

In one example embodiment, the anomaly detection model 216 is based on an autoencoder and reconstruction error, where the domain vector 212 is input to an encoder in the autoencoder as:

$$s_\theta(x_t) \equiv \| x_t - G_{\theta_G}(F_{\theta_F}(x_t, z_t)) \|^2$$

where t is a timestamp for the current observation, $x_t$ is a current observation at the observation point t, $G_{\theta_G}$ is the encoder, $F_{\theta_F}$ is a decoder, and $\theta^*$ is a parameter for the anomaly detection model 216.

In one example embodiment, the operations further comprise training the anomaly detection model 216 and the online deep sets 208 by minimizing an anomaly detection loss, comprising an unsupervised term, a supervised term or both, for each observation point where:

$$\mathcal{L} \equiv \frac{1}{D} \sum_d L^{(d)}, \text{ where}$$

$$L^{(d)} \equiv \frac{1}{N_t^{(d)}} \sum_{x \in X^{(d)}} s_\theta(x) - \frac{\lambda}{N_t^{+(d)} N_t^{-(d)}} \sum_{x^+ \in X^{+(d)}, x^- \in X^{-(d)}} f(s_\theta(x^+) - s_\theta(x^-))$$

wherein N is a count of samples, $\lambda$ is a hyperparameter, f is the sigmoid function, x is the current observation, t is a timestamp for the current observation, and d is a domain identifier.

In one example embodiment, the anomaly detection loss further comprises a regularization term defined to impose the domain vector 212 based on a small squared loss between the domain vector 212 at the observation point and the domain vector 212 with only a small number of samples: $\|z_t - \rho_{\theta_\rho}(\eta_{\theta_\eta}(x_t))\|^2$, wherein $x_t$ is the current observation, t is a timestamp for the current observation, $\rho_{\theta_\rho}$ is a first neural network, and $\eta_{\theta_\eta}$ is a second neural network. (A skilled artisan would understand the appropriate degree of the term "small" based, for example, on domain-dependent heuristics.)

In one example embodiment, the operations further comprise updating the online deep sets 208 and the anomaly detection model 216 based on the target domain sample 204.

In one example embodiment, a regularization term is added to impose the domain vector 212 with a smaller target sample size that is close to that of a largest sample size at the observation point.

In one example embodiment, a regularization term is added to impose an intermediate representation in online deep sets contrastive between different source domains.

In one example embodiment, the anomaly detection loss further comprises a regularization term defined to impose a negative of a small squared loss between the domain vector at the current observation and a domain vector for the other domains:

$$\sum_{d' \neq d_t} \|z^{(d_t)} - z^{(d')}\|,$$

wherein $d_t$ is a domain identifier for the current observation and t is a timestamp for the current observation. (A skilled artisan would understand the appropriate degree of the term "small" based, for example, on domain-dependent heuristics.)

In one example embodiment, the online deep sets 208 expands its summation to a recurrence formula as defined by:

$$z'_t(x_t, d_t) \equiv \rho_{\theta_\rho} \frac{1}{t}(\eta_{\theta_\eta}(x_t) + (t-1)\xi_{t-1,d_t}),$$

wherein $x_t$ is the current observation, t is a timestamp for the current observation, $\rho_{\theta_\rho}$ is a first neural network, and $\eta_{\theta_\eta}$ is a second neural network.

In one example embodiment, the online deep sets 208 expands its summation to a recurrence formula as defined by:

$$\check{z}_t(x_t,d_t) = \rho_{\theta_\rho}\beta(\eta_{\theta_\eta}(x_t) + (1-\beta)\xi_{t-1,d_t}),$$

wherein $0 < \beta < 1$, $\xi_{\{t-1,d_t\}} \equiv \sum_{x_\iota \in X_{(t,d)}} \eta_{\theta_\eta}(x_\iota)$, $x_t$ is the current observation, t is a timestamp for the current observation, and $\rho_{\theta_\rho}$ is a first neural network.

In another aspect, a non-transitory computer readable medium includes computer executable instructions which when executed by a computer cause the computer to perform any one, some, or all of the method steps just described. See, e.g., FIG. 5 and accompanying text.

In still another aspect, an exemplary apparatus includes a memory; and at least one processor, coupled to the memory, and operative to perform any one, some, or all of the method steps just described. See, e.g., FIG. 5 and accompanying text.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
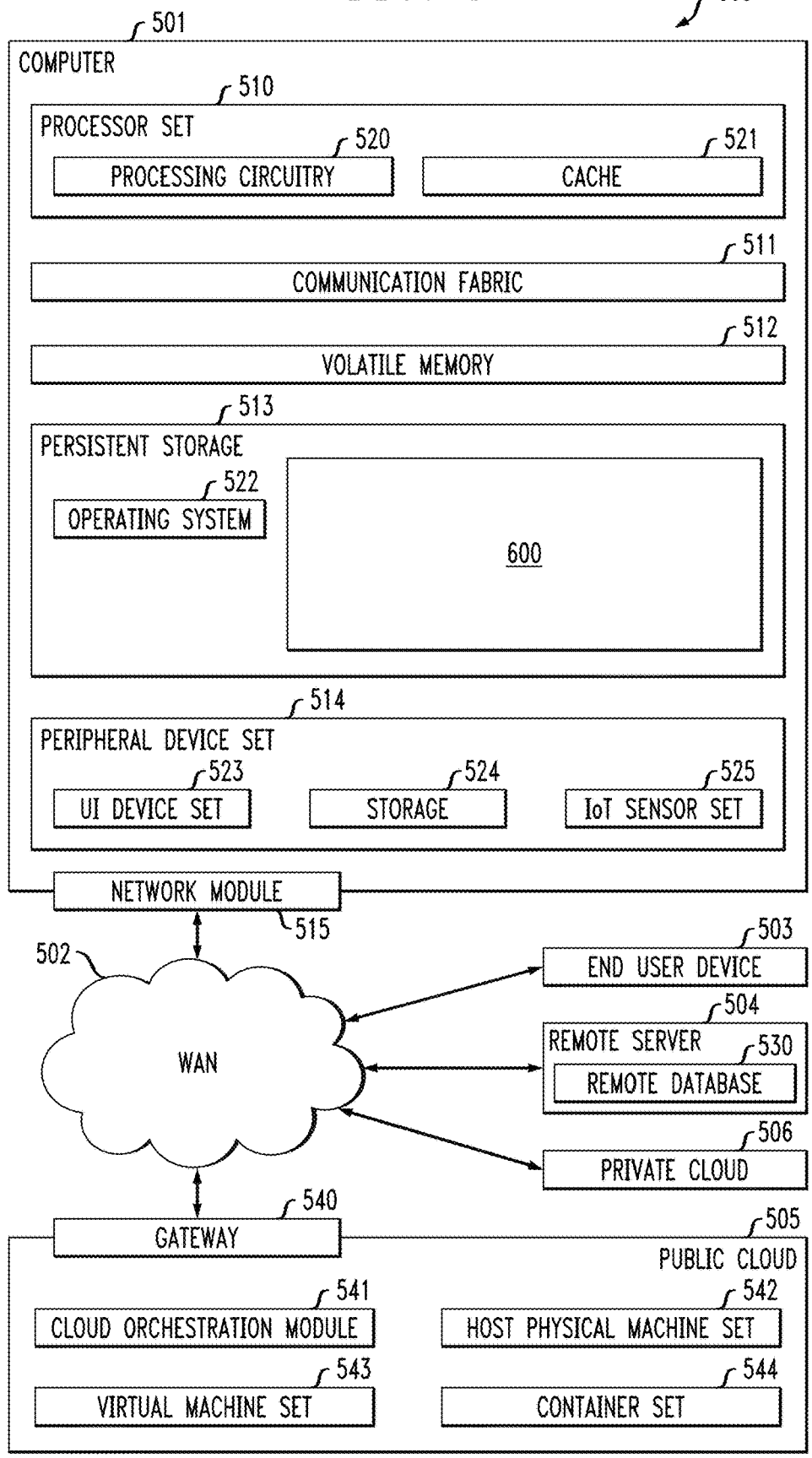
FIG. 5 depicts a computing environment according to an embodiment of the present invention.

Refer now to FIG. 5.

Computing environment 500 contains an example of an environment for the execution of at least some of the computer code involved in performing the inventive methods, such as training models as described herein and/or deploying and running the trained models, as seen at 600. In addition to block 600, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 600, as identified above), peripheral device set 514 (including user interface (UI) device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 600 in persistent storage 513.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 600 in persistent storage 513.

COMMUNICATION FABRIC 511 is the signal conduction path that allows the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, volatile memory 512 is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface-type operating systems that employ a kernel. The code included in block 600 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the interne. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

One or more embodiments of the invention, or elements thereof, can thus be implemented in the form of an apparatus including a memory and at least one processor that is coupled to the memory and operative to perform exemplary method steps. FIG. 5 depicts a computer system that may be useful in implementing one or more aspects and/or elements of the invention It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    accessing a computerized machine learning anomaly detection model trained on a plurality of samples of one or more source domains;
    computing, using online deep sets, one or more domain vectors for each target domain sample at an observation point, each target domain sample corresponding to a given target domain, where the one or more domain vectors represent a similarity and difference among one or more of the source domains and the given target domain; and
    processing the target domain sample using the anomaly detection model to generate an anomaly score, the processing being based on the computed one or more domain vectors.

2. The method of claim 1, wherein, in the accessing step, the computerized machine learning anomaly detection model is further trained on the plurality of samples of one or more source domains and the target domain.

3. The method of claim 1, further comprising classifying the target domain sample based on the anomaly score.

4. The method of claim 1, where the online deep sets are defined by expanding a summation of Deep sets to a recurrence formula as defined by:

$$z_t(x_t, d_t) \equiv \rho_{\theta_\rho}(\eta_{\theta_\eta}(x_t) + \xi_{(t-1, d_t)}),$$

where t is a timestamp for a current observation, $\xi_{(t,d)} \equiv \Sigma_{x_i \in X_{(t,d)}} \eta_{\theta_\eta}(x_i)$, where $\rho_{\theta_\rho}$ is a first neural network, $\eta_{\theta_\eta}$ is a second neural network, $x_t$ is the current observation at the observation point t, and $d_t$ is a domain identifier at the observation point t.

5. The method of claim 1, wherein the anomaly detection model is based on an autoencoder and reconstruction error, where the one or more domain vectors are input to an encoder in the autoencoder as:

$$s_\theta(x_t) \equiv \|x_t - G_{\theta_G}(F_{\theta_F}(x_t, z_t))\|^2$$

where t is a timestamp for a current observation, $x_t$ is a current observation at the observation point t, $G_{\theta_G}$ is the encoder, $F_{\theta_F}$ is a decoder, and $\theta_*$ is a parameter for the anomaly detection model.

6. The method of claim 1, further comprising training the anomaly detection model and the online deep sets by minimizing an anomaly detection loss, comprising an unsupervised term, a supervised term or both, for each observation point or every fixed-intervals or every intervals defined with a function of observation point where:

$$\mathcal{L} \equiv \frac{1}{D} \sum_d L^{(d)}, \text{ where}$$

$$L^{(d)} \equiv \frac{1}{N_t^{(d)}} \sum_{x \in X^{(d)}} s_\theta(x) - \frac{\lambda}{N_t^{+(d)} N_t^{-(d)}} \sum_{x^+ \in X^{+(d)}, x^- \in X^{-(d)}} f(s_\theta(x^+) - s_\theta(x^-))$$

wherein N is a count of samples, $\lambda$ is a hyperparameter, $f$ is the sigmoid function, x is the current observation, t is a timestamp for a current observation, and d is a domain identifier.

7. The method of claim 6, where the anomaly detection loss further comprises a regularization term defined to impose a small squared loss between the one or more domain vectors at a current observation point and the one or more domain vectors with only a small number of samples:

$$\|z_t - \rho_{\theta_\rho}(\eta_{\theta_\eta}(x_t))\|^2,$$

wherein $x_t$ is the current observation, t is a timestamp for the current observation, $\rho_{\theta_\rho}$ is a first neural network, and $\eta_{\theta_\eta}$ is a second neural network.

8. The method of claim 6, where the anomaly detection loss further comprises a regularization term defined to impose a negative of a squared loss between the one or more domain vectors at a current observation and one or more domain vectors for other domains:

$$\sum_{d' \neq d_t} \|z^{(d_t)} - z^{(d')}\|,$$

wherein $d_t$ is a domain identifier for the current observation and t is a timestamp for the current observation.

9. The method of claim 1, wherein a regularization term is added to impose the one or more domain vectors with a smaller target sample size that is close to that of a largest sample size at the observation point.

10. The method of claim 1, further comprising updating the online deep sets and the anomaly detection model based on the target domain sample.

11. The method of claim 1, wherein a regularization term is added to impose an intermediate representation in online deep sets contrastive between different source domains.

12. The method of claim 1, wherein the online deep sets expands its summation to a recurrence formula as defined by:

$$z'_t(x_t, d_t) \equiv \rho_{\theta_\rho} \frac{1}{t}(\eta_{\theta_\eta}(x_t) + (t-1)\xi_{(t-1,d_t)}),$$

wherein $\xi_{(t-1,d_t)} \equiv \Sigma_{x_i \in X_{(t,d)}} \eta_{\theta_\eta}(x_i)$, $x_t$ is a current observation, t is a timestamp for the current observation, $\rho_{\theta_\rho}$ is a first neural network, and $\eta_{\theta_\eta}$ is a second neural network.

13. The method of claim 1, wherein the online deep sets expands its summation to a recurrence formula as defined by:

$$\xi_t(x_t,d_t) = \rho_{\theta_\rho}\beta(\eta_{\theta_\eta}(x_t)) + (1-\beta)\xi_{\{t-1,d_t\}}),$$

wherein $0<\beta<1$, $\xi_{\{t-1,d_t\}} \equiv \Sigma_{x_i \in X_{\{t,d\}}}\eta_{\theta_\eta}(x_1)$, $x_t$ is a current observation, t is a timestamp for the current observation, and $\rho_{\theta_\rho}$ is a first neural network.

14. An apparatus comprising:
a memory; and
at least one processor, coupled to said memory, and operative to perform operations comprising:
  accessing a computerized machine learning anomaly detection model trained on a plurality of samples of one or more source domains;
  computing, using online deep sets, one or more domain vectors for each target domain sample at an observation point, each target domain sample corresponding to a given target domain, where the one or more domain vectors represent a similarity and difference among one or more of the source domains and the given target domain; and
  processing the target domain sample using the anomaly detection model trained on the plurality of samples of the source domain to generate an anomaly score, the processing being based on the computed one or more domain vectors.

15. The apparatus of claim 14, wherein the computerized machine learning anomaly detection model is further trained on the plurality of samples of one or more source domains and the target domain.

16. The apparatus of claim 14, wherein the one or more domain vectors are computed with online deep sets.

17. The apparatus of claim 14, where the online deep sets are defined by expanding a summation of Deep sets to a recurrence formula as defined by:

$$z_t(x_t,d_t) = \rho_{\theta_\rho}(\eta_{\theta_\eta}(x_t) + \xi_{\{t-1,d_t\}}),$$

where t is a timestamp for a current observation, $\xi_{\{t,d\}} \equiv \Sigma_{x_i \in X_{\{t,d\}}}\eta_{\theta_\eta}(x_1)$, where $\rho_{\theta_\rho}$ is a first neural network, $\eta_{\theta_\eta}$ is a second neural network, $x_t$ is the current observation at observation point t, and $d_t$ is a domain identifier at the observation point t.

18. The apparatus of claim 14, wherein the anomaly detection model is based on an autoencoder and reconstruction error, where the one or more domain vectors are input to an encoder in the autoencoder as:

$$s_\theta(x_t) \equiv \|x_t - G_{\theta_G}(F_{\theta_F}(x_t,z_t))\|^2$$

where t is a timestamp for a current observation, $x_t$ is a current observation at observation point t, $G_{\theta_G}$ is the encoder, $F_{\theta_F}$ is a decoder, and $\theta_*$ is a parameter for the anomaly detection model.

19. The apparatus of claim 14, the operations further comprising training the anomaly detection model and the online deep sets by minimizing an anomaly detection loss, comprising an unsupervised term, a supervised term or both, for each observation point or every fixed-intervals or every intervals defined with a function of observation point where:

$$\mathcal{L} \equiv \frac{1}{D}\sum_d L^{(d)}, \text{ where}$$

$$L^{(d)} \equiv \frac{1}{N_t^{(d)}}\sum_{x \in X^{(d)}} s_\theta(x) - \frac{\lambda}{N_t^{+(d)}N_t^{-(d)}}\sum_{x^+ \in X^{+(d)}, x^- \in X^{-(d)}} f(s_\theta(x^+) - s_\theta(x^-))$$

wherein N is a count of samples, $\lambda$ is a hyperparameter, $f$ is the sigmoid function, x is the current observation, t is a timestamp for a current observation, and d is a domain identifier.

20. A non-transitory computer readable medium comprising computer executable instructions which when executed by a computer cause the computer to perform a method of:
  accessing a computerized machine learning anomaly detection model trained on a plurality of samples of one or more source domains;
  computing, using online deep sets, one or more domain vectors for each target domain sample at an observation point, each target domain sample corresponding to a given target domain, where the one or more domain vectors represent a similarity and difference among one or more of the source domains and the given target domain; and
  processing the target domain sample using the anomaly detection model trained on the plurality of samples of the source to generate an anomaly score, the processing being based on the computed domain vector.

* * * * *